(12) United States Patent
Rompage et al.

(10) Patent No.: US 9,751,389 B2
(45) Date of Patent: Sep. 5, 2017

(54) VEHICLE FRAME WATER BAFFLE ARRANGEMENT, WATER BAFFLE AND METHOD

(71) Applicant: Honda Motor Co., Ltd., Tokyo (JP)

(72) Inventors: Adam J. Rompage, Dublin, OH (US); Edward W. Bach, Galloway, OH (US); Robert G. ZumMallen, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 14/991,798

(22) Filed: Jan. 8, 2016

(65) Prior Publication Data

US 2017/0197500 A1    Jul. 13, 2017

(51) Int. Cl.
| | | |
|---|---|---|
| *B60J 10/25* | (2016.01) | |
| *B60J 10/00* | (2016.01) | |
| *B60J 10/40* | (2016.01) | |
| *B60R 13/07* | (2006.01) | |

(52) U.S. Cl.
CPC ............... *B60J 10/25* (2016.02); *B60J 10/40* (2016.02); *B60J 10/45* (2016.02); *B60R 13/07* (2013.01)

(58) Field of Classification Search
CPC ... B60J 10/20; B60J 10/24; B60J 10/25; B60J 10/30; B60J 10/34; B60J 10/40; B60J 10/45; B60R 13/07; B62D 25/04; B62D 25/08
USPC .................. 296/193.06, 203.03, 205, 208
See application file for complete search history.

(56) References Cited

U.S. PATENT DOCUMENTS

| | | | |
|---|---|---|---|
| 5,102,188 A * | 4/1992 | Yamane | B29C 44/188 296/187.02 |
| 5,178,435 A | 1/1993 | Anderson | |
| 6,582,012 B1 | 6/2003 | Smith | |
| 6,695,394 B2 | 2/2004 | Takahashi | |
| 7,073,294 B2 | 7/2006 | Yamaoka et al. | |
| 7,156,439 B2 | 1/2007 | Bejin et al. | |
| 8,444,214 B2 * | 5/2013 | Helferty | B60R 13/07 296/187.02 |
| 8,573,355 B2 * | 11/2013 | Franey | B60R 13/08 181/264 |
| 2006/0070320 A1 * | 4/2006 | Otto | B60R 13/08 52/232 |
| 2006/0124386 A1 * | 6/2006 | Helferty | B60R 13/0815 181/268 |

FOREIGN PATENT DOCUMENTS

| | | |
|---|---|---|
| DE | 102008024699 | 11/2009 |
| DE | 102009036446 | 4/2010 |
| EP | 0529262 | 3/1993 |
| WO | 2012039033 | 3/2012 |

* cited by examiner

*Primary Examiner* — Jason S Daniels
(74) *Attorney, Agent, or Firm* — Rankin, Hill & Clark LLP

(57) ABSTRACT

A vehicle frame water baffle arrangement, a water baffle and method include a first closed section of a vehicle frame, a second closed section of the vehicle frame arranged adjacent the first closed section of the vehicle frame, and a water baffle. The water baffle has a body arranged complementarily within the first closed section to inhibit passage of water thereby within the first closed section and a water spout extending from the body of the water baffle into the second closed section to direct water arriving at the water baffle into the second closed section.

22 Claims, 6 Drawing Sheets

VEHICLE FRAME WATER BAFFLE ARRANGEMENT, WATER BAFFLE AND METHOD

BACKGROUND

Various separators or baffles are known for use within sections of a vehicle body frame. A typical separator is contained within a closed-section of the vehicle body and is used to seal it from noise transmission. For example, a pillar member in a vehicle can be formed from an inner panel member and an outer panel member to form a closed section. A sound separator can be arranged within the closed section of the pillar member to seal it from noise transmission. In one embodiment, such a noise separator includes a resin carrier shaped to fit within the closed section and a heat activated foam disposed on a perimeter of the resin carrier that expands when the vehicle body goes through the paint oven for curing of the paint applied to the vehicle. This causes the foam to expand thereby sealing to the closed section and sometimes mounting the separator to the closed section. Optionally, such separators can include apertures therein to pass items. For example, one such item that would pass through a separator disposed in a vehicle frame member is a sunroof drain tube.

SUMMARY

According to one aspect, a water baffle for a vehicle frame includes a body shaped to complementarily fit within a first closed section of the vehicle frame and a drain spout extending from the body into an adjacent second closed section of the vehicle frame to direct any moisture from the first closed section into the second closed section.

According to another aspect, a vehicle frame water baffle arrangement includes a first closed section of a vehicle frame and a second closed section of the vehicle frame arranged adjacent the first closed section of the vehicle frame. The arrangement further includes a water baffle having a body arranged complementarily within the first closed section to inhibit passage of water thereby within the first closed section and a water spout extending from the body of the water baffle into the second closed section to direct water arriving at the water baffle into the second closed section.

According to a further aspect, a water baffle method for a vehicle frame includes providing a first closed section of the vehicle frame, providing a second closed section of the vehicle frame that is adjacent the first closed section, and directing water via a water baffle having a body and a drain spout from the first closed section to the second closed section.

DETAILED DESCRIPTION

Figure 1:
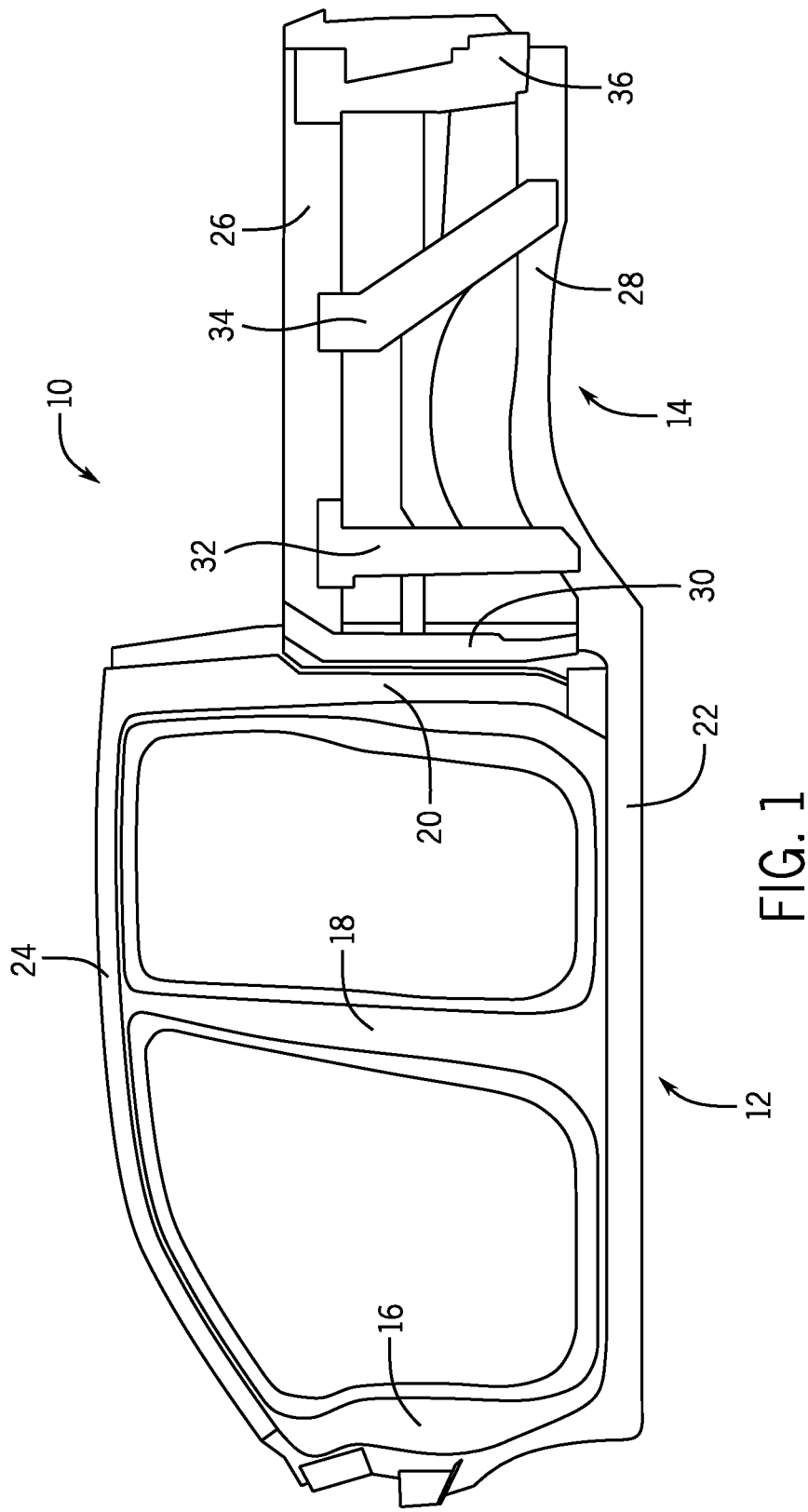
FIG. 1 is a schematic side elevation view of a vehicle frame having a cab portion and a bed portion according to an exemplary embodiment.

With reference now to the figures, wherein the illustrations are for purposes of illustrating one or more exemplary embodiments and not for purposes of limiting the same, FIG. 1 shows a vehicle frame 10 having a cab portion 12 and a bed portion 14. The cab portion 12 is comprised of a plurality of vertical pillars, including a first or A-pillar 16, a second or B-pillar 18, and a third or C-pillar 20. The pillars 16, 18, 20, which can also be referred to as pillar members, are connected to one another at lower ends thereof by a side sill or side sill member 22 and at upper ends thereof by a roof rail 24. Only one side of the vehicle frame 10 is shown in FIG. 1.

The bed portion 14 includes a bed rail 26, a lower rear frame member 28, and a plurality of connecting members 30, 32, 34, and 36 extending between the bed rail 26 and the lower rear frame member 28. Additionally, the bed rail 26 and the lower rear frame member 28 are secured to the pillar 20 of the cab portion 12 to thereby connect the bed portion 14 to the cab portion 12. In one embodiment, the bed portion 14 is a wet area that has water drains (not shown) and is not sealed and, in contrast, the cab portion 12 is a dry area and its frame members (e.g., pillars 16, 18, 20; the side sill 22; and the roof rail 24) are sealed. The bed rail 26 is generally longitudinally oriented horizontally (i.e., a longitudinal extent of the bed rail 26 is generally horizontally oriented).

Figure 2:
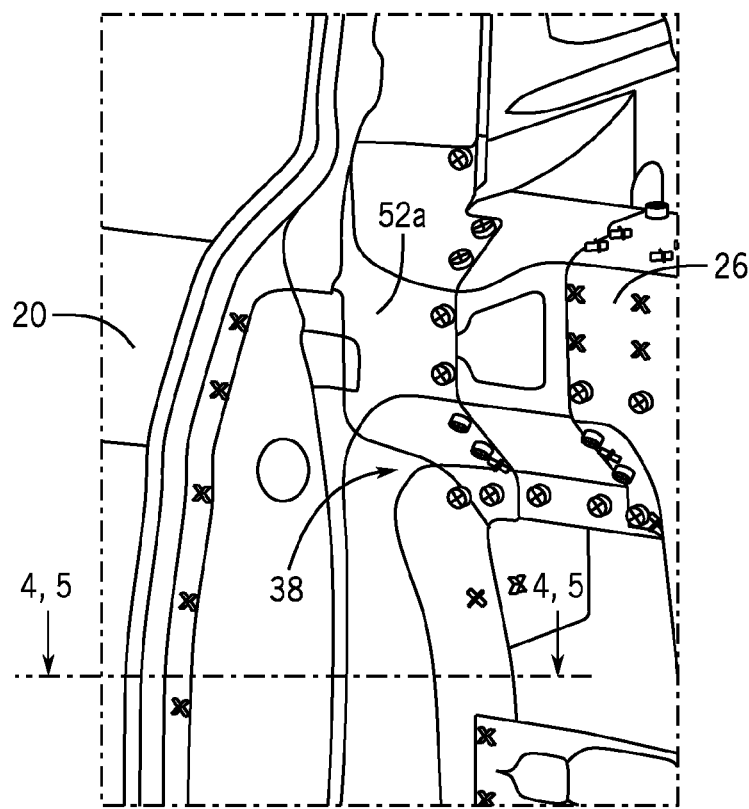
FIG. 2 is a partial perspective view of the vehicle frame of FIG. 1 showing connection area between a bed rail of the bed portion and a vertical pillar member of the cab portion.
Figure 3:
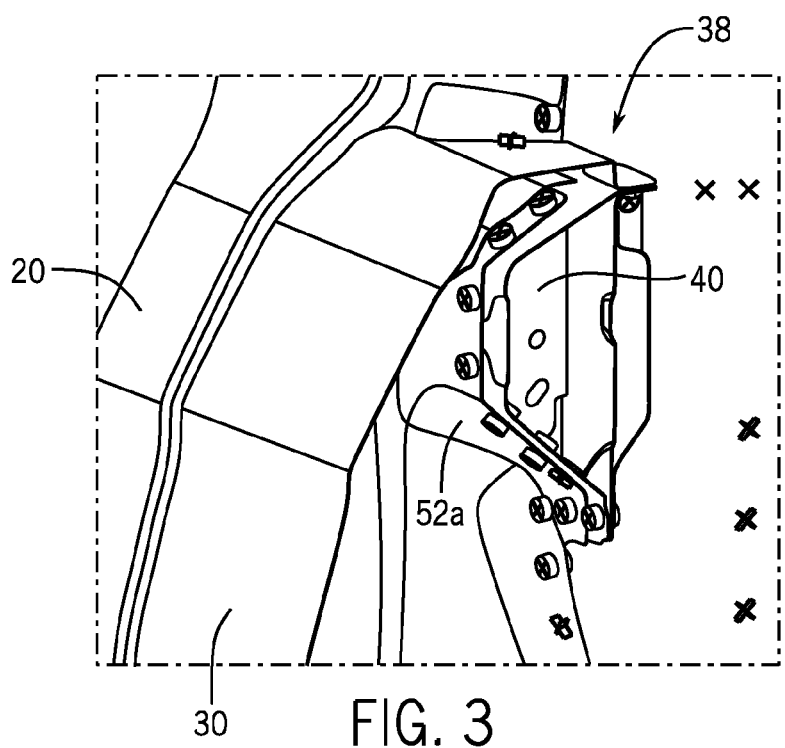
FIG. 3 is a partial perspective view of the connection area shown in FIG. 2 but shown with the bed rail in cross-section.

With additional reference to FIGS. 2 and 3, a connection area 38 is illustrated where the bed rail 26 connects to the pillar 20. FIG. 2 shows the connection area 38 with the rear fender 30, which is the forward-most one of the connecting members, removed. FIG. 3 is shown partially in cross-section to illustrate a separator 40 provided within the bed rail 26 for purposes of inhibiting water flow into the pillar 20 of the cab portion 12. The separator 40 and sealing (not shown) between the bed portion 14 and the cab portion 12 function to eliminate or severely inhibit water flow from the bed portion 14 into the cab portion 12 via the bed rail 26. Nonetheless, it is possible that water could infiltrate the pillar 20 and thus the cab portion 12 of the vehicle frame 10.

Figure 4:
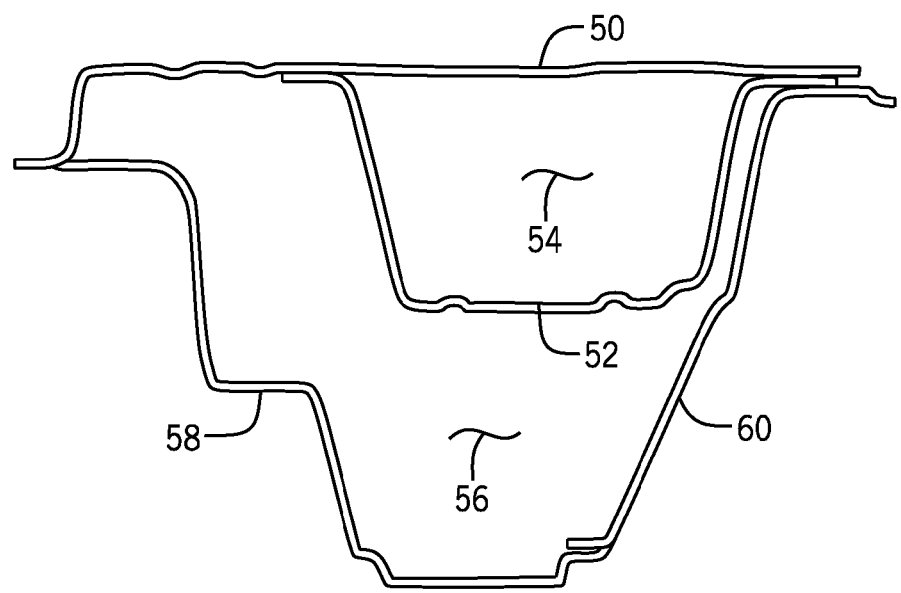
FIG. 4 is a schematic vertical cross-section view of the pillar member taken at the line 4-4 of FIG. 2 shown without any baffles.
Figure 5:
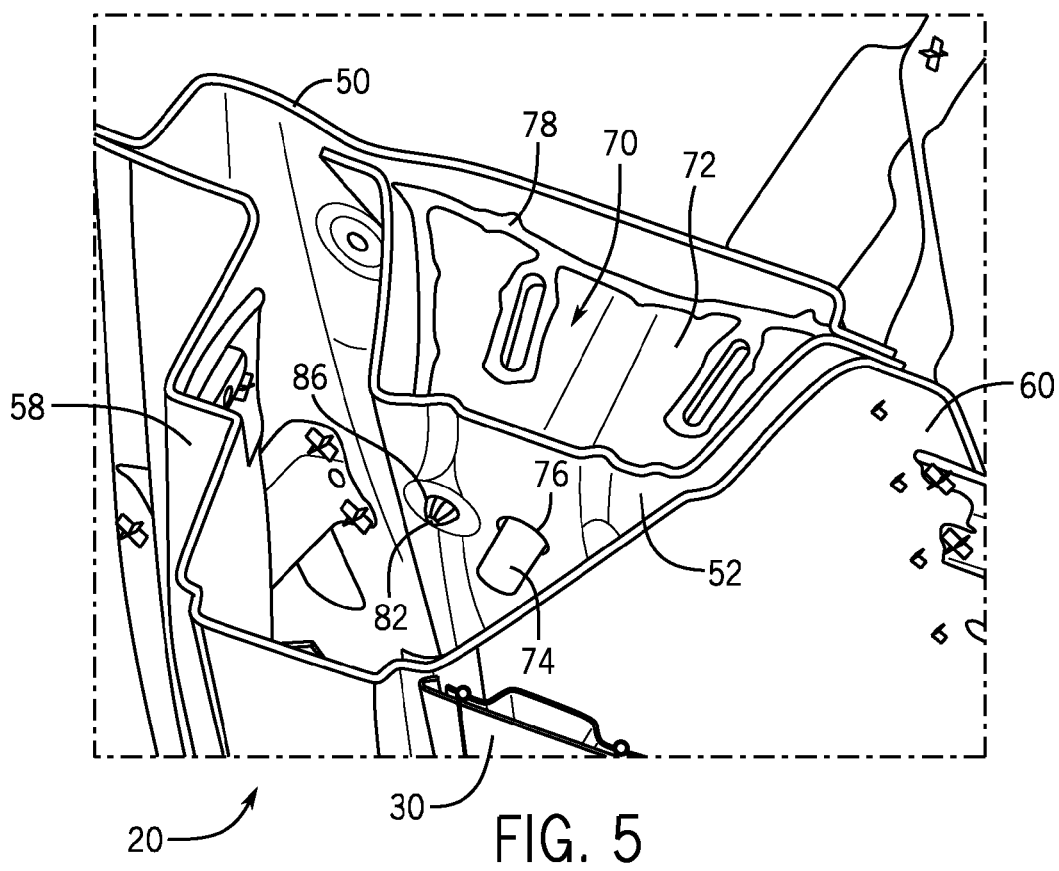
FIG. 5 is a perspective cross-section view of the pillar member taken at the line 5-5 of FIG. 2 and showing a water baffle mounted therein.

With additional reference to FIGS. 4 and 5, the pillar 20 is formed by an inner panel member 50 to which a reinforcement panel member 52 is secured, such as by welding, to form a first closed section 54. As shown in FIGS. 2 and 3, the reinforcement panel member 52 includes a branch portion 52a to which the bed rail 26 is secured. In addition to the first closed section 54, the pillar 20 further includes a second closed section 56 formed by at least one outer panel member (e.g., members 58 and 60) being secured to the inner panel member 50 with the reinforcement panel member 52 interposed between the inner panel member 50 and the at least one outer panel member. In the illustrated embodiment, the at least one outer panel member includes a forward outer panel member 58 and a rearward outer panel member 60. These members 58, 60 can be secured to one another and secured to the inner panel member 50 via welding. Of course, the precise number of panel members can vary and need not be exactly as shown in the illustrated embodiment (e.g., the member 58 and 60 could be formed as a single panel).

Figure 6:
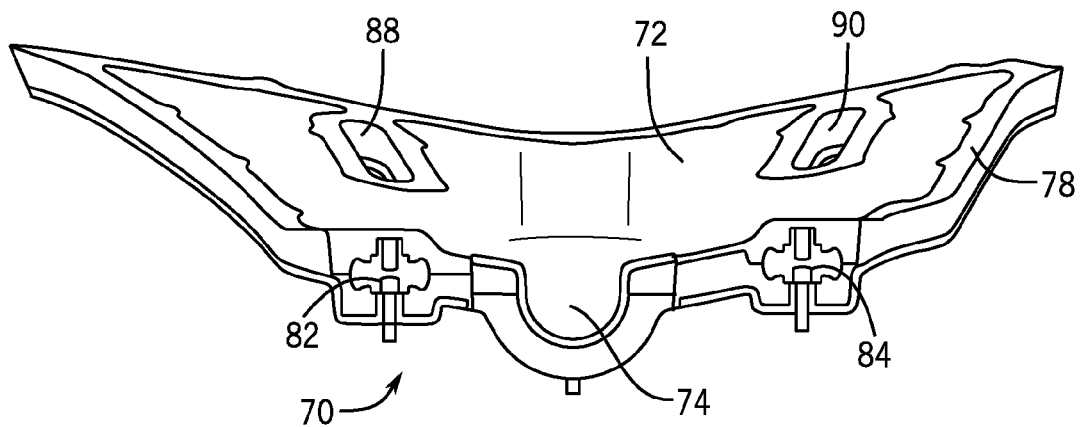
FIG. 6 is a side elevation view of the water baffle according to an exemplary embodiment.
Figure 7:
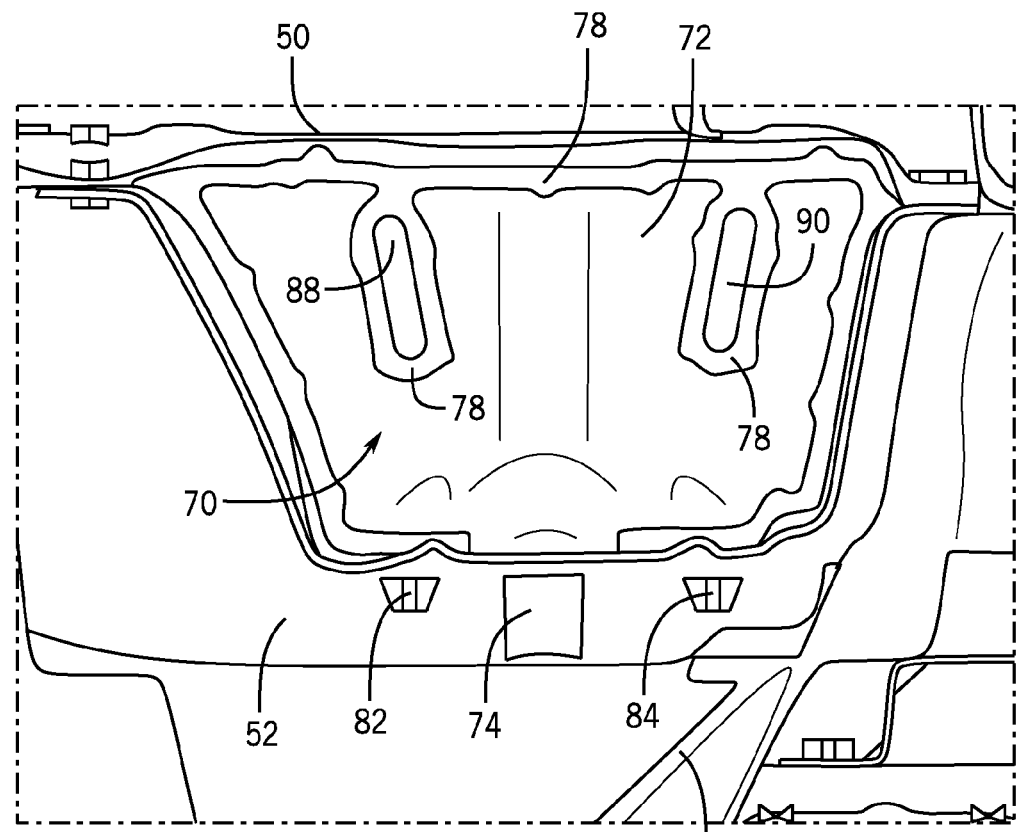
FIG. 7 is a top perspective view, partially in cross-section, showing the water baffle mounted within the vertical pillar member.

With additional reference to FIGS. 5, 6 and 7, a vehicle frame water baffle arrangement is provided that includes the first closed section 54 of the vehicle frame 10 and the second closed section 56 of the vehicle frame 10 that is arranged adjacent the first closed section 54 of the vehicle frame 10. In particular, in the illustrated embodiment, the first closed section 54 is provided adjacent and within the second closed section 56. The arrangement further includes a water baffle 70 which is arranged and provided to inhibit water flow downward within the pillar 20 and to direct any such water flow out of the first closed section 54.

In particular, the water baffle 70 of the illustrated embodiment includes a body 72 arranged complementarily within the first closed section 54 to inhibit passage of water thereby within the first closed section 54. That is, the body 72 of the water baffle 70 is shaped to complementarily fit within the first closed section 54 of the vehicle frame 10 to catch any water or moisture traveling downward within the pillar 20 inside the first closed section 54. The water baffle 70 further includes a drain or water spout 74 extending from the body 72 into the second closed section 56 that is adjacent the first closed section 54 of the vehicle frame 10 to direct any moisture from the first closed section 54 into the second closed section 56 (i.e., to direct water arriving at the water baffle 70 into the second closed section 56). The drain spout 74 particularly extends through an aperture 76 defined in the reinforcement panel member 52 that defines, at least in part, the first closed section 54 of the vehicle frame 10 (i.e., in the illustrated embodiment, the reinforcement panel member 52 together with the inner panel member 50 defines the first closed section 54). In one embodiment, the drain spout 74 and the body 72 are integrally formed (e.g., formed as a single, unitary piece, such as by injection molding). As shown in the illustrated embodiment, the drain spout 74 is particularly arranged to direct water away from the first closed section 54 in a laterally outward direction relative to the vehicle frame 10 and into the second closed section 56.

More specifically, the body 72 of the water baffle 70 is generally orthogonally arranged within the first closed section 54 relative to a longitudinal extent of the pillar 20 and thus a longitudinal extent of the first closed section 54 defined by the pillar 20. The longitudinal extents of the pillar 20 and the first closed section 54 are particularly arranged (i.e., longitudinally arranged) in a generally vertical orientation (i.e., longitudinally oriented vertically). That is, the first closed section 54 extends longitudinally in a vertical direction as it forms, in the illustrated embodiment, a portion of the pillar 20. The location of the water baffle 70, and thus the body 72, can particularly be such that it is below wherein bed rail 26 connects to the reinforcement panel member 52 (see FIGS. 2, 3 and 8). Thus, the reinforcement panel member 52 is secured to the bed rail 26 at a location above the body 72 of the water baffle 70. This location allows the water baffle 70 to be oriented within the first closed section 54 so that it inhibits water moving downward therepast such as might occur if water from the bed portion 14 (which is a wet area) breaches the pillar 20 and particularly the first closed section 54 of the pillar 20.

Additionally, the water baffle 70 can include a heat expandable foam 78. As shown the foam 78 can be disposed about a perimeter of the body 72 to seal between the body 72 and the first closed section 54 of the vehicle frame 10 and thereby prevent any moisture (e.g., water) from passing the body 72 between the perimeter of the body 72 and the first closed section 54 of the vehicle frame 10. In the illustrated embodiment, the heat expandable foam 78 is shown in a pre-expanded position. The heat expandable foam can be a heat activated foam that expands upon heating, such as when the vehicle frame 10 is passed through a paint oven as is known and understood by those skilled in the art.

The water baffle 70 can further include at least one clip (two clips 80, 82 in the illustrated embodiment) disposed on the body 72 for at least temporarily mounting the body 72 within the first closed section 54 at least until the heat expandable foam 78 is heat activated to seal to the vehicle frame 10 and also to mount the body 72 to the vehicle frame 10. The at least one clip can be integrally formed with the body 72 (i.e., the body 72 and the at least one clip can be integrally formed as a single, unitary piece, such as by injection molding for example). In the illustrated embodiment, clips 80, 82 are received through apertures 86 (only one shown, see FIG. 5) defined in the reinforcement panel member 52. As best shown in FIG. 6, the body 72 of the water baffle 70 can be generally funnel shaped to direct any moisture (e.g., water) thereon toward the drain spout 74. In other words, the body 72 can have a generally V-shape that funnels water toward the drain spout 74. In particular, the body 72 can be shaped so that water landing on the water baffle 70 is generally directed toward the drain spout 74 and away from the perimeter of the body 72 with the exception of the location at which the drain spout 74 is located on the perimeter. Optionally, the body 72 of the water baffle 70 can define at least one aperture therethrough (e.g., apertures 88, 90 in the illustrated embodiment) that is spaced apart from the perimeter. These can be provided for allowing various vehicle components (e.g., sunroof drain tubes, wiring, etc.) to pass through the water baffle 70. The heat expandable foam 78 can be disposed about each of the at least one apertures, i.e., apertures 88, 90 in the illustrated embodiment.

Figure 8:
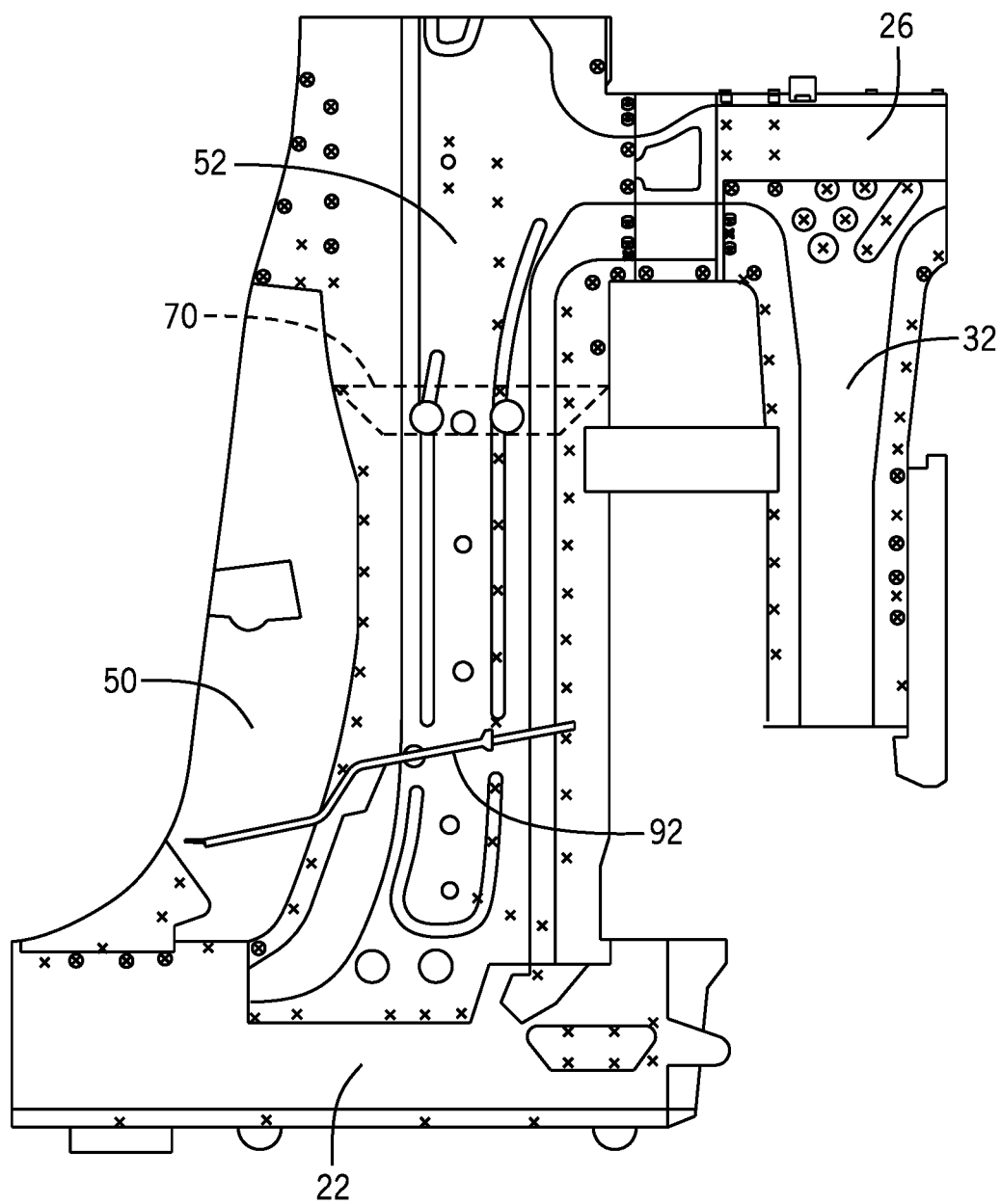
FIG. 8 is a partial side elevational view shown with outer panel members of the vertical pillar member removed to show a second water baffle posited vertically below the first water baffle of FIGS. 5-7.
Figure 9:
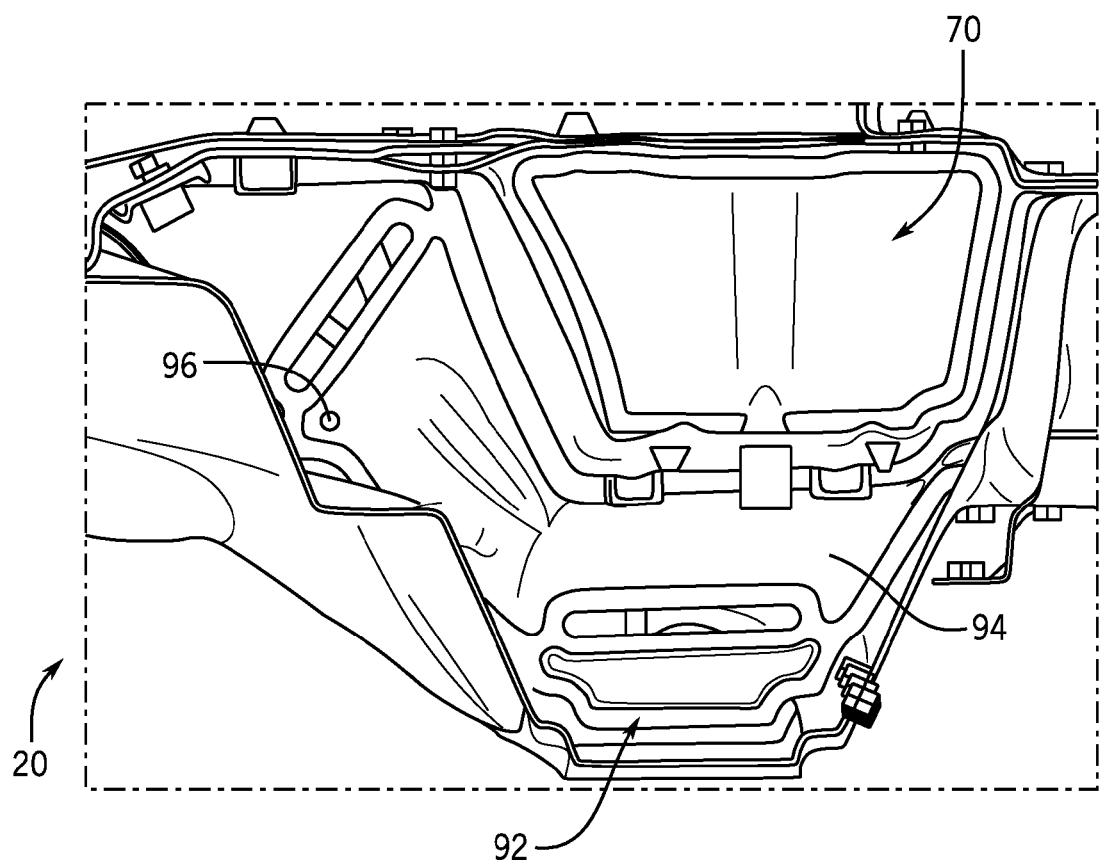
FIG. 9 is another top perspective view, partially in cross-section, showing the drain spout directing water to a the second water baffle.

With reference now to FIGS. 8 and 9, the vehicle frame water baffle arrangement optionally includes a second water baffle 92. When the second water baffle 92 is included, the water baffle 70 is the first water baffle. The second water baffle 92 can have a second water baffle body 94 arranged complementarily within the second closed section 56 to inhibit passage of water thereby within the second closed section 56. As shown, the second water baffle 92 can be arranged at a location below the first water baffle 70. Similar to the function of the first water baffle 70, the second water baffle 92 can catch moisture, such as water, traveling downward in the second closed section 56. The second water baffle body 94 can include a drain 96 and can be shaped to direct any water or moisture toward the drain 96.

By the foregoing, a water baffle method for a vehicle frame is provided. The method includes providing a first closed section 54 of a vehicle frame 10 and providing a second closed section 56 of the vehicle frame 10 that is adjacent the first closed section 54. Water is directed via the water baffle 70 having a body 72 and a drain spout 74 from the first closed section 54 to the second closed section 56. Advantageously, the first closed section 54 may not have a direct path to an external drain, hence the need to direct water to the second closed section, which may have a direct path to an external drain (e.g., drain 96).

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the present disclosure.

The invention claimed is:

1. A water baffle for a vehicle frame, comprising:
a body shaped to complementarily fit within a first closed section of the vehicle frame; and
a drain spout extending from the body into an adjacent second closed section of the vehicle frame to direct any moisture from the first closed section into the second closed section, wherein the drain spout extends through an aperture defined in a panel member defining the first closed section of the vehicle frame.

2. The water baffle of claim 1 further including:
a heat expandable foam disposed about a perimeter of the body to seal between the body and the first closed section of the vehicle frame and thereby prevent any moisture from passing the body between the perimeter of the body and the first closed section of the vehicle frame.

3. The water baffle of claim 2 including at least one clip integrally formed with the body for at least temporarily mounting the body within the first closed section at least until the heat expandable foam is heat activated to seal to the vehicle frame and also to mount the body to the vehicle frame.

4. The water baffle of claim 1 wherein the panel member is a reinforcement panel member secured to an inner panel member to form the first closed section.

5. The water baffle of claim 4 wherein the second closed section is formed by at least one outer panel member being secured to the inner panel member with the reinforcement panel member interposed between the inner panel member and the at least one outer panel member.

6. The water baffle of claim 4 wherein the reinforcement panel member is secured to a bed rail section at a location above the body.

7. The water baffle of claim 1 wherein the body is generally orthogonally arranged within the first closed section and the first closed section is longitudinally arranged in a generally vertical orientation.

8. The water baffle of claim 1 wherein the body is generally funnel shaped to direct any moisture thereon toward the drain spout.

9. A vehicle frame water baffle arrangement, comprising:
a first closed section of a vehicle frame;
a water baffle having a body arranged complementarily within the first closed section to inhibit passage of water thereby within the first closed section; and
a second closed section of the vehicle frame arranged adjacent the first closed section of the vehicle frame and separated from the first closed section by a panel member; and
a water spout extending from the body of the water baffle into the second closed section, the water baffle directing water arriving at the water baffle to exit the first closed section and to enter into the second closed section.

10. The vehicle frame water baffle arrangement of claim 9 wherein the water baffle is a first water baffle and the arrangement further includes:
a second water baffle having a second water baffle body arranged complementarily within the second closed section to inhibit passage of water thereby within the second closed section, the second water baffle arranged at a location below the first water baffle.

11. The vehicle frame water baffle arrangement of claim 9 wherein the body of the water baffle includes a perimeter and defines at least one aperture therethrough that is spaced apart from the perimeter.

12. The vehicle frame water baffle arrangement of claim 11 wherein the water baffle includes a heat expandable foam disposed about the perimeter and disposed about each of said at least one aperture.

13. The vehicle frame water baffle arrangement of claim 9 wherein the body has a generally V-shape to funnel water toward the water spout and wherein the water spout is located adjacent a perimeter of the water baffle to direct water laterally outside the first closed section.

14. The vehicle frame water baffle arrangement of claim 9 wherein the first closed section is longitudinally oriented vertically and the water baffle is oriented within the first closed section to inhibit water moving downward due to gravity within the first closed section.

15. The vehicle frame water baffle arrangement of claim 14 wherein the first closed section is connected to a bed rail section that is longitudinally oriented horizontally.

16. The vehicle frame water baffle arrangement of claim 9 wherein the water baffle includes at least one clip integrally formed with the body and the water spout to mount the water baffle to a vehicle frame panel member forming the first closed section.

17. The vehicle frame water baffle arrangement of claim 9 wherein the first closed section is formed by a vertical pillar of the vehicle frame and the second closed section is located laterally adjacent the first closed section.

18. The vehicle frame water baffle arrangement of claim 17 wherein the water spout is arranged to direct water from the first closed section into the second closed section in a laterally outward direction relative to the vehicle frame, wherein the water spout extends laterally into the second closed section.

19. The vehicle frame water baffle arrangement of claim 9 wherein the water spout extends through an aperture defined in the panel member defining the first closed section of the vehicle frame.

20. The vehicle frame water baffle arrangement of claim 9 wherein the first closed section is provided within the second closed section.

21. A water baffle method for a vehicle frame, comprising:
providing a first closed section of the vehicle frame;
providing a second closed section of the vehicle frame that is laterally adjacent the first closed section and separated from the first closed section by a panel member; and
directing water via a water baffle having a body and drain spout from the first closed section to the second closed section.

22. The water baffle method of claim 21 wherein said directing water via the water baffle includes having the water spout extend through an aperture defined in a panel member defining the first closed section of the vehicle frame.

* * * * *